United States Patent Office 3,318,982
Patented May 9, 1967

3,318,982
PROCESS FOR THE MANUFACTURE OF MIXTURES OF ACID ORTHOPHOSPHORIC ACID ESTERS
Werner Klose, Knapsack, near Cologne, Heinz Harnisch, Lovenich, near Cologne, and Joseph Cremer, Hermulheim, near Cologne, Germany, assignors to Knapsack-Griesheim Aktiengesellschaft, Knapsack, near Cologne, Germany, a corporation of Germany
No Drawing. Filed Dec. 9, 1964, Ser. No. 417,239
Claims priority, application Germany, Dec. 27, 1963,
K 51,730
8 Claims. (Cl. 260—980)

The present invention is concerned with a process for the manufacture of mixtures of acid orthophosphoric acid esters from phosphorus pentoxide and organic hydroxyl compounds.

Various processes are known for making acid phosphoric acid esters. For example, these compounds can be obtained by causing phosphorus oxychloride to undergo partial reaction with organic hydroxyl compounds and by successively subjecting the phosphoric acid ester chloride resulting from such reaction to hydrolysis. However, this method cannot be termed economic because the acid esters are very difficult to separate from their aqueous solution.

On the other hand, more importance is attributed to the reaction of phosphorus pentoxide with organic hydroxyl compounds. In this process, $P_2O_5$ and ROH in the molar ratio of 1:3 are caused to undergo the reaction shown in the following equation:

$$P_2O_5 + 3ROH \rightarrow (RO)_2POOH + ROPO(OH)_2 \quad (1)$$

to yield a mixture comprising phosphoric acid monoesters and diesters.

Various modes of executing this reaction, which all involve more or less serious disadvantages have been described in literature.

The high rate of reaction heat requires special precautionary measures to be taken which must be adhered to in bringing the components together. Speaking generally, this is a reaction of the type wherein small proportions of solid $P_2O_5$ are introduced into an excess of the organic hydroxyl compound. Reversing this order of succession, that is to say adding the organic hydroxyl compound to solid $P_2O_5$, would result in a violent reaction with strong local superheating and formation of dark-colored, tarry products. Phosphorus pentoxide which is extremely hygroscopic is not easy to handle in small proportions, and especially the preparation of rather considerable quantities of phosphoric acid esters calls for rather expensive protective measures to avoid the access both of atmospheric moisture and of organic hydroxyl compound vapors so as to prevent pulverulent $P_2O_5$ from baking together and so as to prevent supply lines from becoming clogged. Lumps which may form in the reaction mixture often cause the reaction to proceed irregularly or cause the reaction to suddenly take a violent course with strong coloration of the resultant product, which again is due to the heterogeneous reaction mixture being locally super-heated.

Proposals have therefore been made to use a $P_2O_5$-dispersion in an organic liquid inert with respect to the other reactants. Replacement of solid $P_2O_5$ with a suspension thereof which is easier to handle involves the difficulty of completely eliminating the dispersing agent from the final product. This must be done because a series of phosphoric acid esters i.e. those with aliphatic alcohols having a mean or relatively long carbon chain, are miscible with substantially all inert solvents useful for this. In order to completely remove the solvent, the reaction mixture, while causing an inert gas to flow therethrough or while maintaining it under reduced pressure, must be heated at temperatures so high that the resulting product often undergoes undesired coloration.

Furthermore, attempts have been made with the aim to react $P_2O_5$ with the organic hydroxyl compound in the presence of hypophosphorous or phosphorous acid and or a salt or an ester of such acid, so as to obtain uncolored or but slightly colored products.

The present invention unexpectedly provides a simple process which in the absence of any auxiliary substances and in the absence of any foreign substance addition enables colorless or but slightly colored products to be obtained wherein, in a first reaction stage, $P_2O_5$ is allowed to react with a mixture of orthophosphoric acid monoesters and diesters of the corresponding hydroxyl compound with the resultant formation of a mixture of acid esters of condensed phosphoric acids and wherein, in a second reaction stage, the mixture so obtained is caused to react with an organic hydroxyl compound, which is used in a proportion equivalent to the $P_2O_5$-proportion with respect to the composition desired to be obtained for the resulting ester mixture, so as to obtain a mixture of orthophosphoric acid monoesters and diesters, the reaction taking place in the manner set forth in the following equation:

$$nP_2O_5 + m[(RO)_2POOH + ROPO(OH)_2]$$
$$\rightarrow \{(RO)_{3m}P_{2(n+m)}O_{5n+2m}(OH)_{3m}\} \quad (2)$$

$$\{(RO)_{3m}P_{2(n+m)}O_{5n+2m}(OH)_{3m}\} + 3nROH$$
$$\rightarrow n + m[(RO)_2POOH + ROPO(OH)_2] \quad (3)$$

gross: $nP_2O_5 + 3nROH \rightarrow n[(RO)_2POOH$
$$+ ROPO(OH)_2] \quad (1)$$

The formula portion appearing in the { } brackets in the above formulae is understood to merely define the gross composition of the mixture obtained, but it is not understood to indicate the compounds actually present in the mixture. It is assumed, however, that a mixture of acid polyphosphoric acid esters varying in their degree of condensation and of acid orthophosphoric acid esters is concerned.

By partially replacing the organic hydroxyl compound with a corresponding proportion of water, the ratio of monoester to diester can be shifted in favor of the monoester. In the extreme case, a mixture containing a predominant proportion of monoesters will therefore be obtained as indicated in Equations 4 to 6:

$$nP_2O_5 + 2mROPO(OH)_2$$
$$\rightarrow \{(RO)_{2m}P_2(n+m)O_{5n+2m}(OH)_{4m}\} \quad (4)$$

$$\{(RO)_{2n}P_2(n+m)O_{5n+2m}(OH)_{4m}\} + 2nROH$$
$$+ nH_2O \rightarrow 2_{(n+m)}ROPO(OH)_2 \quad (5)$$

gross: $nP_2O_5 + 2nROH + nH_2O \rightarrow 2nROPO(OH)_2 \quad (6)$

This method of conducting the reaction involves various advantages. The amount of heat corresponding to gross reaction (1) is not set free at once, but is distributed among the separate reaction stages (2) and (3), which permits improved dissipation of heat. The reaction of the $P_2O_5$ with the monoester and diester mixture proceeds more moderately than the reaction with the corresponding organic hydroxyl compound. These two facts permit processing larger $P_2O_5$-proportions without the coloration of the product being affected, and make handling essentially easier. The organic hydroxyl compounds useful in the present process include compounds of the general formula ROH of the type wherein R represents any desired, optionally substituted organic radical which, however, contains no functional groups reacting with $P_2O_5$ other than OH-groups. Straight chain, branched or cyclic aliphatic alcohols having 1 to 18 carbon atoms, polyhydroxyl compounds or oxethylated compounds are preferably employed.

The ratio of $P_2O_5$ to the acid phosphoric acid ester mixture may vary within wide limits. It has been found, however, that the ratio of $n:m$ in Equation 2 above should preferably not exceed a value of 1:2, which corresponds to the gross composition of a pyrophosphoric acid ester, so as to obtain a product unobjectionable in coloration. The ratio of $n:m$ can be shifted as desired to the opposite side but with no further processing advantage for too strong shifting of $n:m$ to smaller values which means increase in volume associated with smaller space/time yields. The components are preferably reacted with one another in the ratio of 1:3 to 1:6.

The process of the present invention can be carried out batchwise or in continuous operation with the final product being partially refluxed.

For batchwise operation, the reaction components which have previously been mixed in a corresponding ratio, i.e. $P_2O_5$ and phosphoric acid ester, are stirred in an appropriate acid-proof vessel with the exclusion of atmospheric moisture until a substantially homogeneous mixture will be obtained, which is maintained at a temperature of 20–100° C., preferably 40–60° C., if necessary by cooling. Cooling is continued, if necessary, and a quantity of the organic hydroxyl compound equivalent to the $P_2O_5$-quantity is added to the reaction mixture in such a manner that the latter is maintained within the temperature limits set forth above.

For continuous operation, the $P_2O_5$ is reacted in a coolable mixer with the ester mixture cycled therein and the resulting reaction product is reacted in an appropriate second mixing vessel with the organic hydroxyl compound. A quantity of final product equivalent to the $P_2O_5$-feed is removed after the second vessel, and the balance portion thereof is refluxed into the first mixing vessel. The two vessels are maintained at temperatures corresponding to those maintained for discontinuous operation.

The process of the present invention for making mixtures of acid orthophosphoric acid esters from phosphorus pentoxide and organic hydroxyl compounds comprises more especially reacting $P_2O_5$ in a first reaction stage with a mixture of orthophosphoric acid mono- and diesters of the corresponding organic hydroxyl compound with the formation of a mixture of acid esters of condensed phosphoric acids and reacting the mixture so obtained in a second reaction stage with the organic hydroxyl compound, which is used in a proportion equivalent to the $P_2O_5$-proportion with respect to the composition desired to be obtained for the resulting ester mixture, so as to obtain a mixture of orthophosphoric acid monoesters and diesters. The ratio of the monoester to the diester can be shifted in favor of the monoester by replacing a proportion of the organic hydroxyl compound with a corresponding proportion of water. The ratio of mols $P_2O_5$ to mols orthophosphoric acid monoester and diester mixture in the feed mixture should be kept smaller than 1:2, and should preferably be 1:3 to 1:6.

For discontinuous operation, the reaction components which have previously been mixed in a corresponding ratio, i.e. $P_2O_5$ and phosphoric acid ester, are stirred in a appropriate vessel with the exclusion of atmospheric moisture until a substantially homogeneous mixture will be obtained, which is maintained at a temperature of 20–100° C., preferably 40–60° C., if necessary by cooling. Cooling is continued, if necessary, and a quantity of the organic hydroxyl compound equivalent to the $P_2O_5$-quantity is added to the reaction mixture in such a manner that the latter is maintained within the temperature limits set forth above.

For continuous operation, the $P_2O_5$ is reacted in a first reactor with the orthophosphoric acid ester mixture cycled therein and used as the feed, and the resulting reaction product is reacted in an appropriate second vessel with the organic hydroxyl compound. A quantity of final product equivalent to the $P_2O_5$-feed is removed and the balance is refluxed into the first vessel, the two vessels being maintained at temperatures of 20 to 100° C., preferably of 40 to 60° C.

In the process of the present invention, the organic hydroxyl compound is a compound of the general formula ROH of the type wherein R represents any desired and optionally substituted organic radical which, however, contains no functional groups reacting with $P_2O_5$ other than OH-groups. Straight chain, branched or cyclic aliphatic alcohols having 1 to 18 carbon atoms, polyhydroxyl compounds or oxyethylated compounds are preferably employed.

*Example 1.—Phosphoric acid mono- and dimethylester*

In a 300-liter stirring vessel provided with a heating and cooling means, 20 kg. $P_2O_5$ were added to 100 kg. of a mixture comprising phosphoric acid mono- and dimethylesters. The temperature of the whole mixture rose to 65° C. The whole was stirred for 15 minutes while cooling with a temperature drop to 40° C., and 13.6 kg. methanol were added during a further 15 minutes. The temperature was maintained at 40–50° C. by cooling. The addition of $P_2O_5$ and methanol was repeated in the manner set forth above until a total of 180 kg. $P_2O_5$ and a total of 121 kg. methanol had been added. The reaction was completed by heating the mixture for 1 hour at 100° C. After removal of the 100 kg. ester mixture first introduced into the stirring vessel, there were obtained 300 kg. phosphoric acid mono- and dimethylester; $d^{20}_4=1.42$; Hazen color index number: 70. The yield was 100%.

*Example 2.—Phosphoric acid mono- and di-2-chloroethylester*

In an apparatus comprising a heatable and coolable stirring vessel and a high speed mixer, a mixture of phosphoric acid mono- and di-2-chloroethylesters was cycled at a temperature of 50–60° C. 10 kg. $P_2O_5$ and 17 kg. 2-chloroethanol were introduced per hour into the mixer, and 27 kg. phosphoric acid mono- and di-2-chloroethylesters were obtained per hour; $d^{20}_4=1.53$; Hazen color index number: 50. The yield was 100%.

*Example 3.—Phosphoric acid mono- and dicyclohexylester*

In a manner analogous to that described in Example 1, 100 kg. phosphoric acid mono- and dicyclohexylester were alternately admixed with 20 kg. $P_2O_5$ and with 42.3 kg. cyclohexanol until 250 kg. phosphoric acid mono- and dicyclohexylesters had been prepared. $d^{20}_4=1.20$; Hazen color index number: 80.

*Example 4.—Phosphoric acid mono- and diphenylester*

In a manner analogous to that described in Example 1, 100 kg. phosphoric acid mono- and diphenylester were alternately admixed with 20 kg. $P_2O_5$ and with 39.7 kg. phenol until 300 kg. phosphoric acid mono- and diphenylester had been prepared. $d^{20}_4=131$; Hazen color index number: 70.

*Example 5.—Phosphoric acid mono- and diester of butane diol-1,4*

In a kneader provided with a heating and cooling means, 20 kg. of a mixture of acid phosphoric acid esters with butane diol-1,4 were mixed with 6 kg. $P_2O_5$ at a temperature of 60–80° C. for about 30 minutes. 5.7 kg. butane diol-1,4 were added within a further 30 minutes, the temperature being maintained within the limits indicated, if necessary by cooling. Further quantities of $P_2O_5$ and butane diol-1,4 were alternately added until about 35 kg. of a mixture phosphoric acid mono- and diesters with butane diol-1,4 was obtained in the form of a highly viscous liquid, $d^{20}_4=141$; Hazen color index number: 60.

*Example 6.—Phosphoric acid mono- and diester of ethylene glycol*

In a manner analogous to that described in Example 5, 20 kg. of a mixture phosphoric acid mono- and diesters with ethylene glycol were first introduced into the kneader and 6 kg. $P_2O_5$ and 4 kg. ethylene glycol were alternately admixed until 40 kg. phosphoric acid mono- and diesters with ethylene glycol were obtained. $d^{20}_4 = 1.68$; Hazen color index number: 40.

What is claimed is:

1. A process for producing acid orthophosphoric acid esters from phosphorus pentoxide and organic hydroxyl-containing compounds, comprising admixing phosphorus pentoxide with a feed mixture of orthophosphoric acid monoesters and orthophosphoric acid diesters of the general formulae $$(RO)_2POOH \text{ and } ROPO(OH)_2$$

and contacting the resulting product with a reactive amount of an organic hydroxyl compound of the formula $$ROH$$

wherein R is a member selected from the group consisting of a phenyl, straight and branched chain aliphatic of 1–18 carbon atoms, cycloalkyl, the corresponding hydroxy and also the ethoxy-substituted members; and recovering the resulting orthophosphoric acid ester products.

2. A process for producing orthophosphoric acid esters comprising admixing (A) phosphorus pentoxide with (B) a mixture of monoesters and diesters of the formulae $$ROPO(OH)_2 \text{ and } (RO)_2POOH$$

the ratio of (A) to (B) being about 1:2–6; contacting the resulting mixture of acid esters of condensed phosphoric acids with a reactive amount of an alcohol of the formula $$R—OH$$

wherein R is a member selected from the group consisting of a phenyl, straight and branched chain aliphatic of 1–18 carbon atoms, cycloalkyl, corresponding hydroxy and also the ethoxy-substituted members; and recovering the resulting orthophosphoric acid ester products.

3. A process of claim 1, wherein the ratio in monoester to diester is shifted in favor of the monoester by replacing a proportion of the ROH compound with a corresponding proportion of water.

4. A process of claim 1, wherein the ratio in mols of $P_2O_5$ to mols mixture of orthophosphoric acid monoesters and diesters in the feed mixture is less than 1:2.

5. A process of claim 4, wherein the ratio in mols of $P_2O_5$ to mols ester is about 1:3 to 1:6.

6. A process of claim 1, wherein the acid orthophosphoric acid ester mixtures are prepared in discontinuous manner by mixing $P_2O_5$ and orthophosphoric acid ester mixture to obtain a reaction mixture, stirring the reaction mixture while excluding atmospheric moisture to obtain a homogeneous mixture, and thereafter admixing the mixture with ROH, the reaction mixture being maintained during the reaction at a temperature of about 20–100° C.

7. A process of claim 6, wherein the reaction mixture is maintained at a temperature of about 40–60° C.

8. A process of claim 1, wherein the acid orthophosphoric acid ester mixtures are prepared in continuous manner by causing $P_2O_5$ to react in the first reaction stage with orthophosphoric acid ester feed mixture cycled in a first reaction stage with the resultant formation of a reaction mixture, causing the reaction mixture to react in a second reaction stage with ROH, resulting in the formation of the desired orthophosphoric acid ester mixture, withdrawing a proportion of the final product corresponding to the proportion of $P_2O_5$ used as feed, and refluxing the balance portion of said final product into the first reaction stage, the reaction mixture being maintained in the two reaction stages at a temperature of about 20–100° C.

No references cited.

CHARLES B. PARKER, *Primary Examiner.*

RICHARD L. RAYMOND, *Assistant Examiner.*